United States Patent
Scherer et al.

(10) Patent No.: US 9,810,346 B2
(45) Date of Patent: Nov. 7, 2017

(54) VALVE HAVING A SENSOR SYSTEM WITHIN A VALVE HOUSING THAT INCLUDES A SENSOR ARRANGED ON A GROOVE ATTACHED TO A VALVE PLATE

(71) Applicant: GEA Tuchenhagen GmbH, Büchen (DE)

(72) Inventors: Bettina Scherer, Assamstadt (DE); Bernd Porath, Breitenfelde (DE)

(73) Assignee: GEA Tuchenhagen GmbH, Büchen (DE)

( * ) Notice: Subject to any disclaimer, the term of this patent is extended or adjusted under 35 U.S.C. 154(b) by 0 days.

(21) Appl. No.: 15/039,521

(22) PCT Filed: Nov. 21, 2014

(86) PCT No.: PCT/EP2014/003116
§ 371 (c)(1),
(2) Date: May 26, 2016

(87) PCT Pub. No.: WO2015/078568
PCT Pub. Date: Jun. 4, 2015

(65) Prior Publication Data
US 2016/0377193 A1    Dec. 29, 2016

(30) Foreign Application Priority Data

Nov. 26, 2013   (DE) .................. 10 2013 019 702

(51) Int. Cl.
*F16K 37/00* (2006.01)
*F16K 1/12* (2006.01)

(52) U.S. Cl.
CPC ............ *F16K 37/0091* (2013.01); *F16K 1/12* (2013.01); *F16K 37/005* (2013.01)

(58) Field of Classification Search
CPC ....... F16K 37/0091; F16K 1/12; F16K 37/005
USPC .................................. 137/553, 554
See application file for complete search history.

(56) References Cited

U.S. PATENT DOCUMENTS

| 8,000,909 B2 * | 8/2011 | Danzy ............... F16K 17/04 |
| | | 702/50 |
| 8,091,860 B2 * | 1/2012 | Thompson et al. .... F16K 3/246 |
| | | 137/554 |
| 2004/0107767 A1 | 6/2004 | Johnson et al. |
| 2005/0016592 A1 | 1/2005 | Jeromson et al. |
| 2010/0305883 A1 | 12/2010 | Danzy |
| 2012/0186664 A1 * | 7/2012 | DiLeo et al. .......... G01N 5/025 |
| | | 137/334 |

FOREIGN PATENT DOCUMENTS

WO       2006004442 A1    1/2006

* cited by examiner

*Primary Examiner* — Kevin Lee
(74) *Attorney, Agent, or Firm* — Young Basile Hanlon & MacFarlane, P.C.

(57) ABSTRACT

A valve includes a valve housing, which has at least one first connection and a second connection; at least one valve plate arranged in the valve housing; a passage opening arranged between the first connection and the second connection; and at least one valve seat surrounding the passage opening. The valve plate can be brought into contact with the valve seat in order to disconnect a fluid link between the first connection and the second connection. In order that the function of the valve, in particular the position of the valve plate, can be reliably detected, the valve includes a sensor system arranged within the valve housing.

7 Claims, 2 Drawing Sheets ant technical field of the valve function can be determined directly and thus the function of the valve can be checked. The risk of a process progressing in a faulty manner due to an incorrectly assumed valve position and associated technical and economic disadvantages is greatly reduced through the direct measurement of the valve function.

VALVE HAVING A SENSOR SYSTEM WITHIN A VALVE HOUSING THAT INCLUDES A SENSOR ARRANGED ON A GROOVE ATTACHED TO A VALVE PLATE

TECHNICAL FIELD

This disclosure relates to a valve including a sensor system.

BACKGROUND

In the processing industry, in particular beverage technology, food technology, pharmacy and biochemistry, valves are important components for guiding the product components within the processing plant. These valves generally have automatic drives, e.g., based on pneumatic principles, which are controlled by means of plant controllers for changing the valve position. The valve position is an important variable in the guidance of the flows of the product components and is thus captured in the valve and reported to the plant controller.

Currently, the valve position is detected via a sensor, frequently a proximity switch, or via a position measuring system. With these means, the position of the piston rod is measured, which connects the drive with the valve plate, which serves to produce or separate the product flow through the valve. The position of the valve plate in the valve housing is then derived from the position of the piston rod outside of the valve housing and a decision is finally made whether the valve is in the closed or open position. It thus concerns an indirect measurement of the position of the valve plate.

The indirect measurement can lead to faulty measurements of the valve position. If for example a connection between the valve plate, valve rod and position rod or between the piston and the piston rod is released, a movement could be detected. However, this provides no conclusion regarding the position of the valve plate and thus no conclusion about whether or not a medium is let through the valve. It is not clear whether the product path is now opened or closed via the valve. This runs the risk, due to the use of auxiliary variables, of assuming an incorrect position in the plant controller. The process flow would be interrupted in the case of an incorrectly assumed valve position, from which, in part, high costs unnecessarily result.

For the operator of the valve, it is thus of great interest to reliably detect whether the valve now does its job: blocks, distributes or mixes the medium, for example the product, product pre-stage or product component.

In connection with so-called double seat valves with a leakage chamber, it became known from EP 1 766 276 A1 to provide a sensor at the outlet of the leakage chamber, which detects an escaping leakage. This leakage leaks out of the conveyor space, in which the product is located, through defective seals on at least one of the valve plates.

SUMMARY

An object of the invention is to introduce a more reliable measurement of the position of the valve plate.

A central idea for solving this object is to increase the reliability through a direct measurement in the valve. Thus, a sensor system for measuring the valve function is arranged in the valve. The sensor system can be arranged in the housing or on the valve plate or on the housing and valve plate. Through this type of measurement, the impermeability of the valve can be determined directly and thus the function of the valve can be checked. The risk of a process progressing in a faulty manner due to an incorrectly assumed valve position and associated technical and economic disadvantages is greatly reduced through the direct measurement of the valve function.

In particular, two measurement principles are advantageous.

According to the first measurement principle, a meaningful measurement, for example a pressure measurement, is performed with the help of at least one sensor in the sealed area. At least one seal of the valve plate is inserted for example into a groove contour specified for this in order to generate in the closed position of the valve a sealing effect between the valve plate and the valve seat. As soon as the valve plate moves in the direction of the valve seat and the seal is deformed by contact with the valve plate and the resulting force transmission, changed conditions are created (e.g., mechanical pressure conditions) in the groove and on the seat area, which are essential for detection. With the detection of the movement of the seal into the valve seat, a reliable conclusion can be drawn about the effect of the seal.

According to the second measurement principle, sensors that capture or evaluate a temperature change and/or a humidity change are attached at specific locations of the housing and/or of the valve plate in the valve interior space, the product space, separated from a surrounding area of the valve. A signal processing unit can be provided, which determines a change through comparison with a formed or determined reference value. Depending on the process section and the process, conclusions can then be made about the impermeability of the valve or respectively about changes in the process.

The second measurement principle can represent an enhancement of the first measurement principle if the closed position of the valve was already captured via the first measurement principle and other media or flows in the process could be a helpful variable in the detection of a medium in the housing for the further process.

The invention is explained in greater detail based on an exemplary embodiment and the representation of the effects and advantages are covered in a more detailed manner.

DETAILED DESCRIPTION

Figure 1:
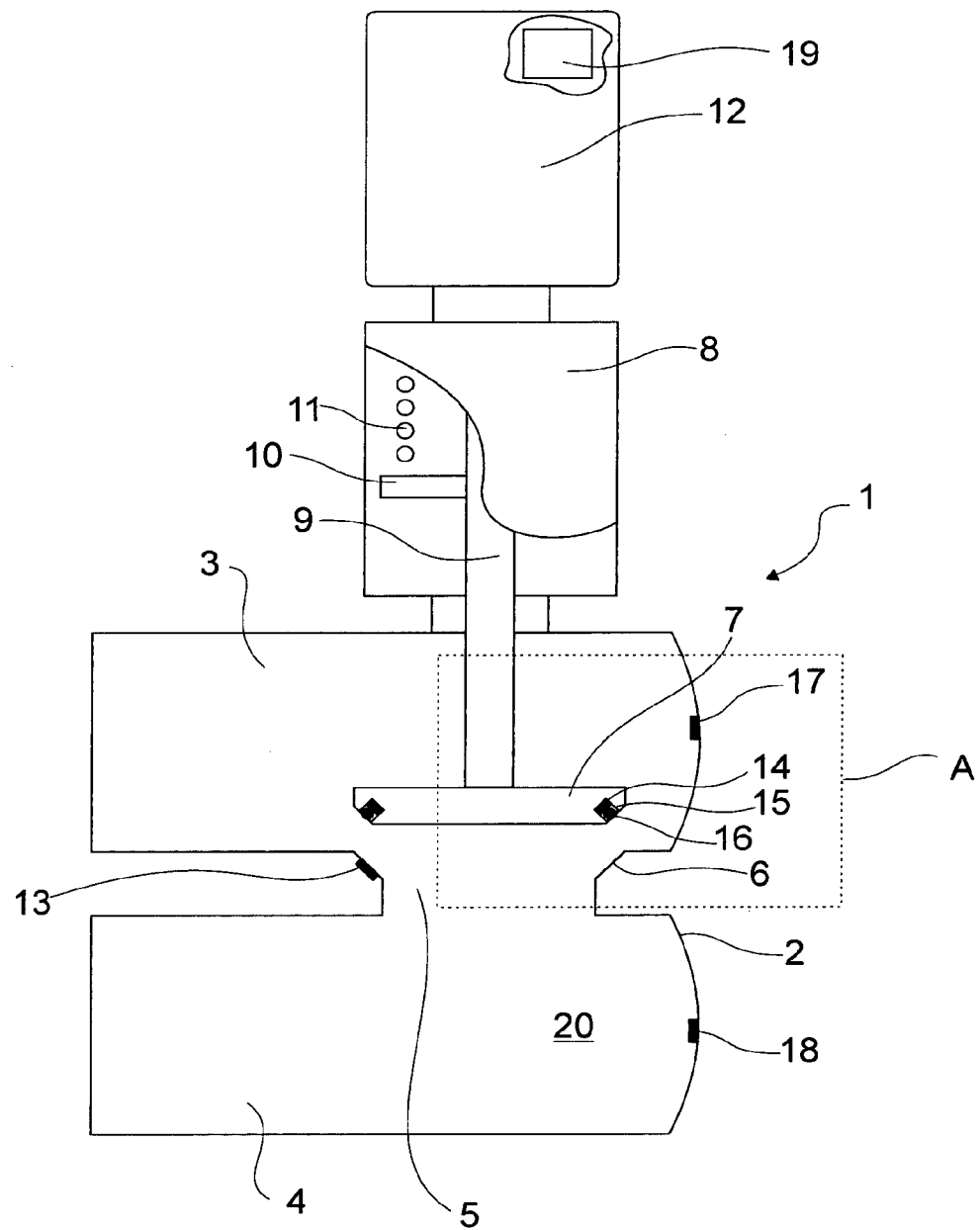
FIG. 1 is a longitudinal section through a valve with a sensor system in an open position of the closing element.

FIG. 1 shows a valve 1 from beverage technology, food technology, the pharmaceutical industry and biochemistry in a schematic section. These areas of application require a hygienic to aseptic design of the valve with respect to the seals, the materials used, for example stainless steel, and the flow guidance.

The valve 1 has a valve housing 2, which has a first pipeline connection 3 and a second pipeline connection 4. The pipeline connections 3 and 4 can be connected with the pipes of a processing plant, for example with a welded connection. A product space 20 and a passage opening 5 are arranged between the pipeline connections 3 and 4 in the valve housing 2. The passage opening 5 is surrounded by a valve seat 6. A valve plate 7, which can be brought into contact with the valve seat 6, is located in the valve housing 2. When valve seat 6 and valve plate 7 are in contact with each other, a fluid link between the first and second pipeline connection 3 and 4 occurring through the product space 20 is interrupted. The fluid link is established when the valve seat 6 and the valve plate 7 are separated.

The movement of the valve plate 7 is effectuated by a drive 8. This can be designed in an electromotive manner. In the example shown, it is designed in a pneumatically operating manner and comprises a piston 10 connected with a valve rod 9, which is moved against the force of a spring 11 with the help of a pressurizing medium. The valve rod 9 is connected with the valve plate 7 so that the movement of the piston 10 is transmitted to the valve plate 7. The drive 8 can be driven by a valve control apparatus 12 connected to the drive 8 or the valve 1, which drives the electromotor or controls the supply of the pressurizing medium in the present example.

A first sensor 13 is arranged on the valve seat 6. It is designed as a pressure sensor and sends a signal that represents forces introduced into it. These forces are generated by the drive 8 and are introduced into the valve seat 6 via the valve plate 7.

Alternatively or additionally, a second sensor 14 can be arranged on a groove 16, which is designed in the valve plate 7. A seal 15 is received in it, which improves the separation of the fluid link in the case of contact between the valve plate 7 and valve seat 6. The seal 15 is designed so that a deformation of the seal 15 takes place in the case of contact between the valve plate 7 and valve seat 6. A force is hereby introduced into the walls of the groove 16, which is measurable with the second sensor 14 designed as a pressure sensor. The second sensor 14 is advantageously arranged such that the deforming seal 15 introduces forces into it, which lead to a signal in the second sensor 14.

Alternatively or in addition to the previously introduced sensor system, at least one fluid sensor can be provided in the valve housing 2. In the shown example, a first fluid sensor 17 and a second fluid sensor 18 are arranged in the interior of the valve housing. The first fluid sensor 17 is provided in the part of the interior connected with the first pipeline connection 3, the second fluid sensor 18 in the part which is connected with the second pipeline connection 4. The first and/or second fluid sensor 17 and 18 can generate a signal, which depends for example on the humidity or temperature in the interior of the valve housing 2. The fluid sensors 17 and 18 can in that case respond to different thermodynamic variables. If sufficient for the process, only one fluid sensor may also be present. The fluid sensors are activated by the presence of fluid, in particular process material, for example liquid, in the interior of the valve 1. It can thus be determined via the signal of the fluid sensor 17 or 18 whether the process material is located at the position in the valve 1 where it is expected to be based on the process. In the open position of the valve plate 7, the fluid sensors 17 and 18 should provide a comparable signal. Differences in the signal can be counterbalanced by calibration during a known operating state of the valve 1.

Different measurement systems are conceivable. For example, the fluid sensor 17 or 18 can be designed to couple a high-frequency electromagnetic alternating field into a medium during contact with the medium and to detect changes occurring by the dielectric properties of the medium. Alternatively, the conductivity of the medium can be used to generate a sensor signal.

For example, a signal processing apparatus or unit 19, which is connected with the existing sensors 13, 14, 17 and/or 18, can be provided in the valve control apparatus 12. It can be set up to determine the switch status of the valve 1 based on a sensor signal and to generate a signal representing the switch status. The signal processing unit 19 can be set up to determine the change in the signal(s) through comparison with a formed or certain reference value. Conclusions regarding the impermeability of the valve or respectively regarding changes in the process can be made depending on the process section and the process.

The valve control apparatus 12 can be set up to provide a sensor signal to a device communicating with the valve control apparatus 12. This can be a device for controlling the process plant so that the sensor signal is available for sequential control of the process.

Figure 2:
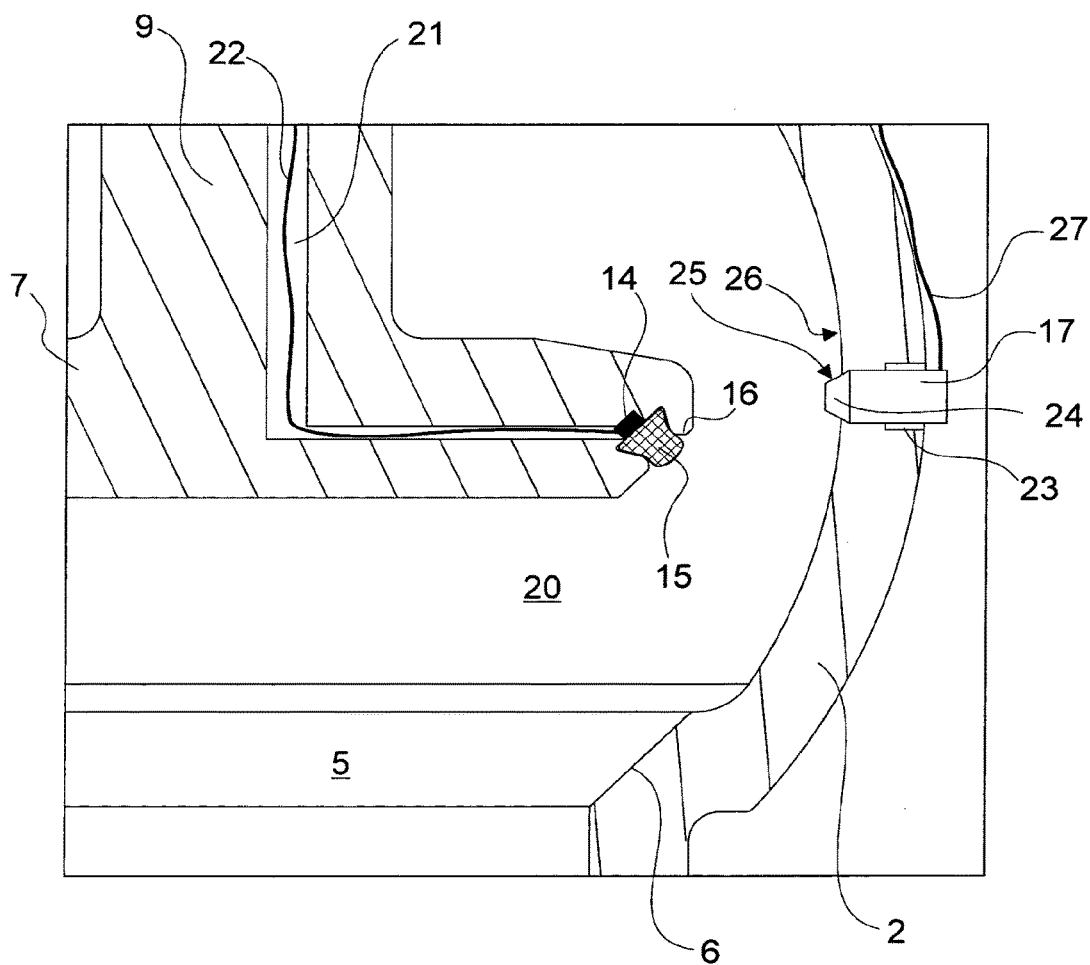
FIG. 2 is a section through the valve housing and valve plate indicated by detail "A" in FIG. 1.

FIG. 2 shows the detail A from FIG. 1 in order to illustrate the installation of the second sensor 14 and the first fluid sensor 17 in a sectional view.

The seal 15 is received in the groove 16 and fills it up so that few to no cavities remain. This applies in particular when the valve plate 7 is located in the closed position. The seal 15 is then clamped between the walls of the groove 16 and the valve seat 6 and deformed. The maximum fill level of the groove 16 is now advantageously reached. The second sensor 14 is thus arranged in the groove 16 so that a force is introduced into it in the closed position of the valve plate 7. This force can also stem from the deformation of the seal 15 and/or the tensioning of the valve plate 7 based on the closing force stemming from the drive 8. For example, an electrical signal is created in the second sensor 14 based on the piezoelectric effect. In a channel 21, which runs through the valve plate 7 and the valve rod 9 and is sealed off from the product space 20, the electrical signal is guided out of the interior of the valve 1 by a first signal line 22. The electrical signal is advantageously guided to the signal processing unit 19 of the valve control apparatus 12.

The first fluid sensor 17 is arranged in the wall of the valve housing 2. For this, a fastening 23 is provided, for example a screw connection of the housing of the first fluid sensor 17 with the valve housing 2, which can be provided with sealants, in order to securely separate the product space 20 from a surrounding area of the valve 1.

The second fluid sensor 18 has a measuring head 24, which protrudes at least partially into the product space 20. A measuring head surface 25 transitions into a housing interior surface 26 of the valve housing 2 in as gap-free and stepless a manner as technically feasible and necessary for achieving hygienic or, if necessary, aseptic standards. For this purpose and depending on the measurement principle, the measuring head surface 25 can be made of stainless steel or polytetrafluoroethylene (PTFE). A second signal line 27 connects the second fluid sensor 18 with the signal processing apparatus 19 of the valve control apparatus 12. This second signal line 27 can be installed, as shown, outside on the valve housing 2.

The valve 1 can be designed, as shown, with a valve plate 7. In a further development, the valve plate 7 can have at least one additional seal. Alternatively, the valve can have at least two valve plates, between which a leakage space can be formed. The goal is to be able to determine the switch position of the valve plates by means of the sensor system constructed according to the design factors shown here.

A list of reference numbers within the drawing figures is below.

1 Valve
2 Valve housing
3 First connection
4 Second connection

5 Passage opening
6 Valve seat
7 Valve plate
8 Drive
9 Valve rod
10 Piston
11 Spring
12 Valve control apparatus
13 First sensor
14 Second sensor
15 Seal
16 Groove
17 First fluid sensor
18 Second fluid sensor
19 Signal processing apparatus
20 Product space
21 Channel
22 First signal line
23 Fastening
24 Measuring head
25 Measuring head surface
26 Housing interior surface
27 Second signal line
A Detail

The invention claimed is:

1. A valve comprising
a valve housing having a first connection and a second connection; a valve plate arranged in the valve housing;
a passage opening arranged between the first connection and the second connection;
a valve seat surrounding the passage opening, wherein the valve plate can be brought into contact with the valve seat in order to disconnect a fluid link between the first connection and the second connection; and
a sensor system arranged within the valve housing, the sensor system comprising:
a plurality of sensors including a fluid sensor, and a sensor arranged on a groove attached to the valve plate and receiving a seal; and
a valve control apparatus having a signal processing apparatus, which is connected with the at least one sensor and is set up to determine a switch status of the valve based on a sensor signal and to generate a signal representing the switch status,
wherein the sensor system is arranged in a product space of the valve housing connecting in a fluid manner the first connection with the second connection, and
wherein a measuring head surface of a measuring head of the fluid sensor transitions sealed into a housing interior surface of the valve housing.

2. The valve according to claim 1, wherein the plurality of sensors comprises an other sensor arranged on the valve seat.

3. The valve according to claim 1, wherein the fluid sensor comprises one of a humidity sensor, a conductivity sensor or a temperature sensor.

4. The valve according to claim 1, wherein the fluid sensor generates a signal depending on a humidity.

5. The valve according to claim 1, wherein the fluid sensor generates a signal depending on a temperature.

6. The valve according to claim 1, wherein the valve control apparatus is set up to provide a sensor signal to a device communicating with the valve control apparatus.

7. The valve according to claim 1, wherein the fluid sensor is a second fluid sensor, and the plurality of sensors comprises a first fluid sensor arranged in a wall of the valve housing.

* * * * *